Patented July 29, 1952

2,605,281

UNITED STATES PATENT OFFICE 2,605,281

CATION-ACTIVE COMPOUNDS DERIVED FROM ALKARYL SULFONYL CHLORIDES OR ALKARYL SULFONATES

Vsevolod Blinoff, Neuilly-sur-Seine, France, assignor to Societe Anonyme d'Innovations Chimiques, so-called "Sinnova" or "Sadic," Meaux-Beauval, France No Drawing. Application April 1, 1949, Serial No. 85,055. In France April 7, 1948

6 Claims. (Cl. 260—501)

The present invention relates to cation-active compounds corresponding to the general formulae:

$$(R\text{-}Ar\text{-}SO_2\text{-}B)^+ (Cl)^-$$

or $$(R\text{-}B)^+ (R'\text{-}Ar\text{-}SO_3)^-$$

or $$(R'B)^+ (R\text{-}Ar\text{-}SO_3)^-$$

in which R designates an alkyl group that contains at least eight carbon atoms and not more than 18 carbon atoms, R' an alkyl group that contains at most eight carbon atoms, Ar an aryl group which may or not be substituted and which may be a benzene, a naphthalene, an anthracene, a phenanthrene, an acenaphthene, a fluoren group or the like, B a radical having the same formula as tertiary aromatic amines such as dimethyl-, diethyl, methylbenzyl, ethylbenzyl-aniline, and so on, or as a tertiary heterocyclic base such as pyridine, picolines, 2.6-lutidine, quinoline, quinaldine, isoquinoline, acridine, and so on; the combination of the arylsulfonyl chlorides $$R\text{-}Ar\text{-}SO_2\text{-}Cl$$

or arylsulpho-esters $R'\text{-}Ar\text{-}SO_3\text{-}R$ or $$R\text{-}Ar\text{-}SO_3\text{-}R'$$

with the aforesaid bases having the same formula as said radical B occurs on the nitrogen atom of the latter, which thus goes over from trivalency to quintivalency; new complexes are formed in this manner.

The bases having the same formula as the radicals B are available on the market.

The sulfonyl chlorides of higher-molecular alkylbenzenes, alkylnaphthalenes, and so on, just the same as those of the lower-molecular ones, are obtained by combining chlorosulfonic acid with the said hydrocarbons or by reacting phosphorus pentachloride with the sodium or the potassium salts of their monosulphonic derivatives.

Two classes of arylsulphonates are suitable for the production of cation-active soaps, viz:

(a) Those which result from the esterification of higher-molecular aliphatic alcohols with benzene sulfonyl chloride, ortho- or para-toluene sulphochloride, xylene sulfonyl chloride, para-cymene sulphochloride, and so on.

(b) Those which result from the esterification of comparatively cheap lower-molecular aliphatic alcohols (methanol, ethanol, propanols, butanols) with sulfonyl chlorides derived from higher-molecular alkylbenzenes, alkylnaphthalenes, and so on.

In either case, they are prepared without difficulties by conventional methods.

The aforementioned aryl sulfonyl chlorides or aryl sulphonates are combined with the tertiary isocyclic or heterocyclic bases by heating an equimolecular mixture thereof at a temperature of 100° C. (under a reflux condenser when pyridine is used). Generally, however, it is advantageous to use two molecules of the base to one of the acidic compound. The complexes formed can be separated quite easily by taking advantage of their insolubility in ether, benzene, and so on, whereby the excess base and the impurities are removed therefrom.

The cation-active compounds according to the invention are obtained generally in the form of white powders which are highly soluble in water to which they will confer an extremely bitter taste. They are inert to Ca and Mg ions. They possess frothing, wetting, equalizing, dispersing, emulsifying and detergent properties which in some instances are better than those of sulphonated fatty acohols. They also possess bactericide and fungicide properties.

Owing to these various properties they are suitable for the manifold applications commonly assigned to commercial cation-active soaps, such as the treatment of natural or artificial textile fibres, the floatation, the cleaning and sterilization of medical and surgical instruments and of household, dairy, wine-making and like implements, as well as for toilet and laundry purposes.

*Example 1.*—Laurylpyridinium phenylsulphonate:

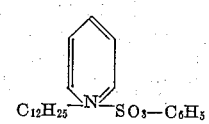

$C_{12}H_{25}\text{-}N\text{-}SO_3\text{-}C_6H_5$ 326 parts by weight of lauryl phenylsulphonate are heated under a reflux condenser with 158 parts by weight of pyridine. When the reaction is completed the excess pyridine is distilled off under a vacuum. The residue once cooled is purified by washing it with ether in which the desired compound is insoluble.

*Example 2.*—Valuable cation-active soaps are obtained quite easily by subjecting phenylsulphonates of saturated or unsaturated aliphatic alcohols containing at least eight carbon atoms, and either derived from fats or from olefinic by-products of the petroleum industry or prepared synthetically to the treatment described in Example 1.

*Example 3.* — Dimethyllaurylphenylammonium phenylsulphonate

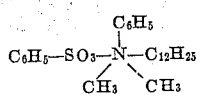

326 parts by weight of lauryl phenylsulphonate are heated to a temperature of 100° C. with 242 parts by weight of dimethylaniline. The quaternary ammonium salt is separated as set forth in Example 1.

*Example 4.*—Valuable dimethylalkylphenylammonium phenylsulphonates are obtained just as easily by subjecting the phenylsulphonates of the alcohols mentioned in Example 2 to the treatment described in Example 3.

*Example 5.*—A cation-active soap from octylbenzene sulfonyl chloride and pyridine:

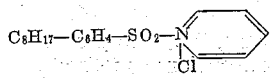

Octylbenzenes such as obtained from industrial octylenes (boiling range 105–120° C.) by the method described in the U. S. patent application Ser. No. 790,700, filed on December 9, 1947, and now abandoned, for: "A method of producing higher-molecular alkyl-benzenes from benzene hydrocarbons and higher-molecular olefines," are treated with chlorosulfonic acid in the same conditions as benzene in the preparation of benzene sulfonyl chlorides.

288.5 parts by weight of octylbenzene sulfonyl chloride are treated as described in Example 1 with 158 parts by weight of pyridine. The yield of the above-formulated cation-active soap is quantitative.

*Example 6.*—The decylbenzene mixture obtained from decylenes by the method set forth in Example 5 is similarly converted into sulfonyl chloride, of which 316.5 parts by weight when treated with 158 parts by weight of pyridine as described in Example 1 will almost quantitatively yield the cation-active soap corresponding to the formula:

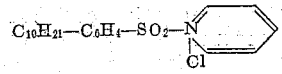

*Example 7.*—The dodecylbenzene mixture obtained from dodecylenes (boiling range 170–210° C.) available in the petroleum industry by the method described in Example 5 are converted similarly into sulfonyl chlorides of which 344.5 parts by weight, when heated as described in Example 1 with 158 parts by weight of pyridine, will almost quantitatively yield the cation-active soap corresponding to the formula:

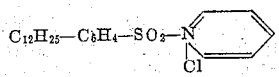

*Example 8.*—The octylbenzene, decylbenzene, dodecylbenzene sulfonyl chlorides according to Examples 5, 6, 7 are converted into the corresponding n-butyl sulphonates.

326 parts by weight of the first one, or 354 parts by weight of the following one, or 382 parts by weight of the last one are treated with 158 parts by weight of pyridine as set forth in Example 1. The pyridinium complexes thus obtained quantitatively correspond respectively to the following formulae:

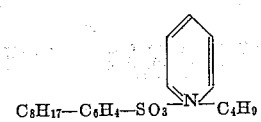

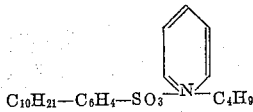

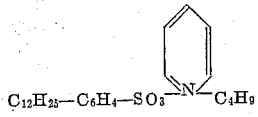

*Example 9.*—326 parts by weight of n-butyl octylbenzene sulphonates, or 354 parts by weight of n-butyl decylbenzene sulphonates, or 382 parts by weight of n-butyl dodecylbenzene sulphonates are heated to a temperature of 100° C. with 242 parts of dimethylaniline. By subjecting the reaction products thus obtained quantitatively to the treatment described in Example 1 there are obtained the compounds that correspond respectively to the following formulae:

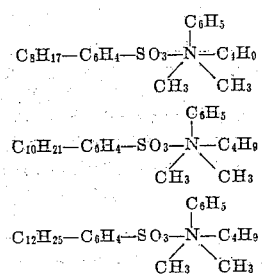

What I claim is:

1. The cation-active product having the formula:

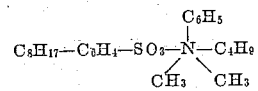

2. A method for obtaining the product having the formula:

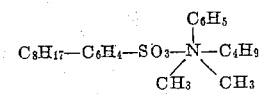

which comprises heating n-butyl octylbenzene sulfonate with dimethylaniline.

3. The cation active products having the formula:

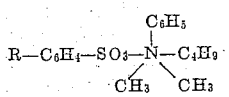

R being an alkyl radical comprising at least eight carbon atoms and not more than 18 carbon atoms.

4. A method for obtaining the products having the formula:

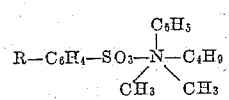

R being an alkyl radical having at least eight carbon atoms and not more than 18 carbon atoms, which said method comprises heating a n-butyl alkylbenzene sulphonate with dimethylaniline.

5. A cation active product having the formula

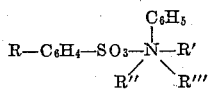

wherein R is an alkyl radical having 8 to 18 carbon atoms, R' is an alkyl radical having at most 8 carbon atoms, R'' and R''' are radicals selected from the group consisting of methyl, ethyl and benzyl.

6. A method of obtaining a product having the formula

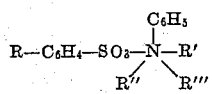

said method comprising heating a tertiary aromatic amine having the formula,

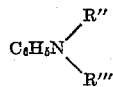

with an alkyl aryl sulphonate of an alcohol having the formula,

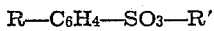

wherein R is an alkyl radical having 8 to 18 carbon atoms, R' is an alkyl radical having at most 8 carbon atoms, R'' and R''' are radicals selected from the group consisting of methyl, ethyl and benzyl.

VSEVOLOD BLINOFF.

REFERENCES CITED

The following references are of record in the file of this patent:

UNITED STATES PATENTS

| Number | Name | Date |
| --- | --- | --- |
| 2,244,512 | Brandt | June 3, 1941 |
| 2,301,796 | Shonle | Nov. 10, 1942 |

FOREIGN PATENTS

| Number | Country | Date |
| --- | --- | --- |
| 545,521 | Great Britain | June 1, 1942 |